Nov. 18, 1924.  
M. HAEBERLEIN  
1,516,095  
HYDRAULIC TURBINE PLANT  
Filed June 13, 1922  
3 Sheets-Sheet 1

Inventor  
Max Haeberlein  
By his Attorneys

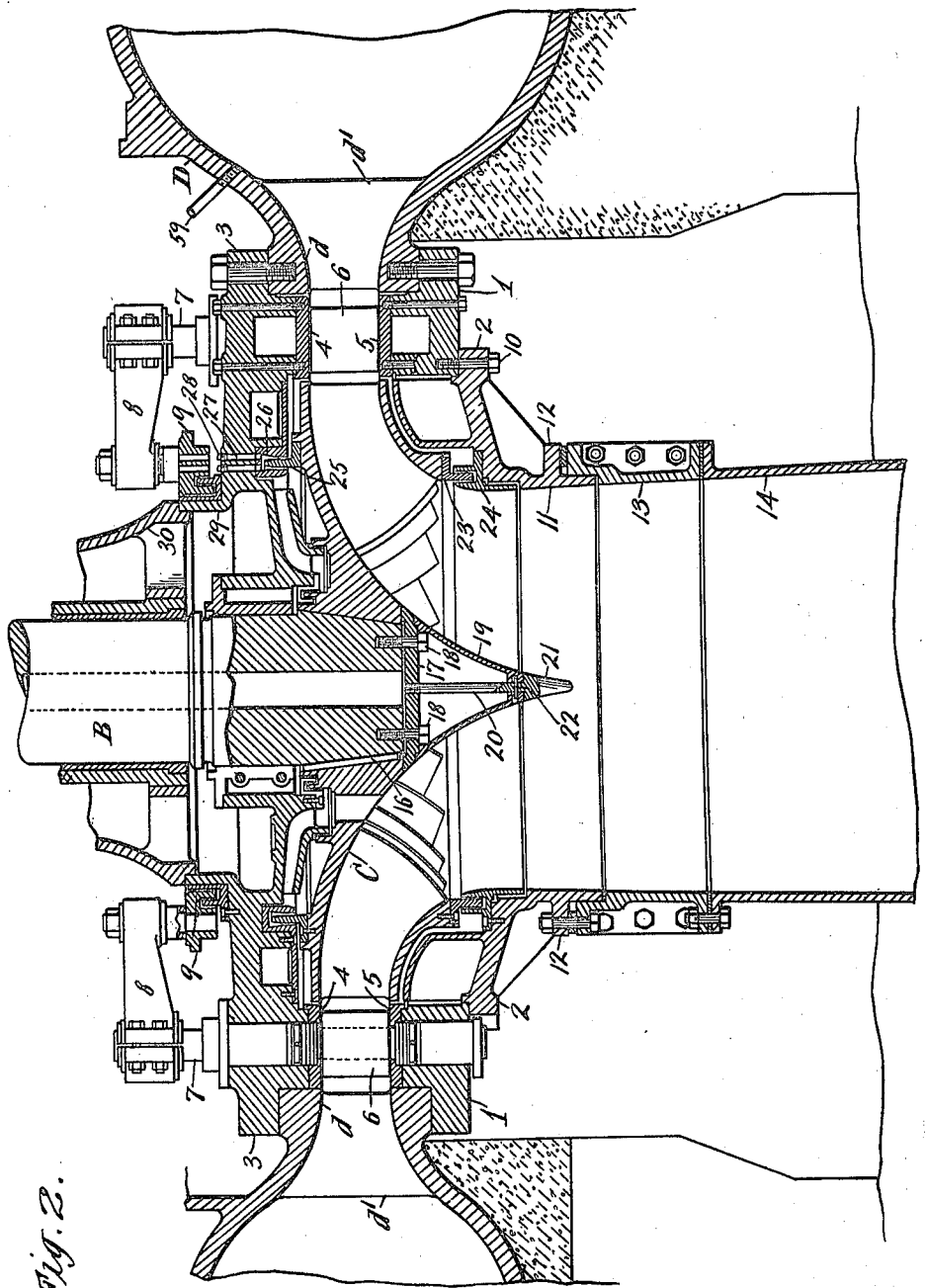

Nov. 18, 1924.  
M. HAEBERLEIN  
1,516,095  
HYDRAULIC TURBINE PLANT  
Filed June 13, 1922      3 Sheets-Sheet 3
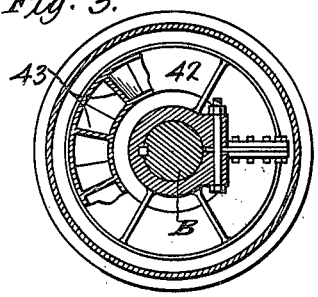
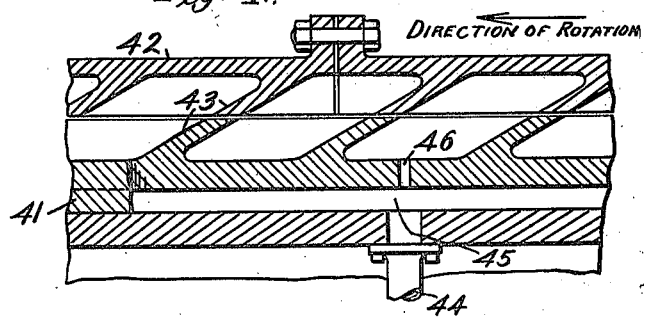
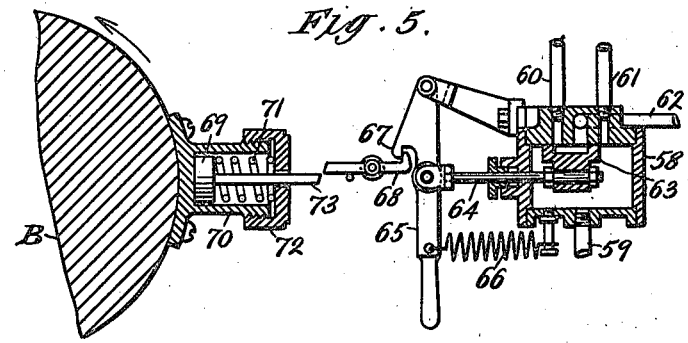
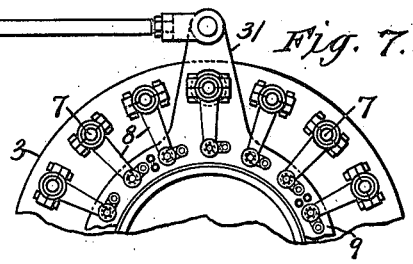
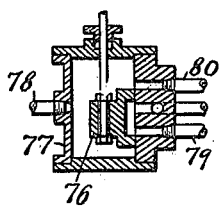
Inventor  
Max Haeberlein  
By his Attorneys Patented Nov. 18, 1924.

1,516,095

UNITED STATES PATENT OFFICE.

MAX HAEBERLEIN, OF MAPLEWOOD, NEW JERSEY, ASSIGNOR TO WORTHINGTON PUMP AND MACHINERY CORPORATION, OF NEW YORK, N. Y., A CORPORATION OF VIRGINIA.

HYDRAULIC TURBINE PLANT.

Application filed June 13, 1922. Serial No. 567,933.

*To all whom it may concern:*

Be it known that I, MAX HAEBERLEIN, a citizen of the United States, residing at Maplewood, county of Essex, and State of New Jersey, have invented certain new and useful Improvements in Hydraulic Turbine Plants, fully described and represented in the following specification and the accompanying drawings, forming a part of the same.

This invention relates to improvements in hydraulic turbine plants, and particularly to a hydro-electric plant.

The object of the invention is to provide a hydraulic plant which will permit of very close regulation of speed, which will be safe against accidents to the governor mechanism, which may be quickly and positively stopped, and in which inspection and repairs may be made relatively quickly.

With these general objects in view the invention comprises the features, details of construction and combination of parts which will first be described in connection with the accompanying drawings and then more particularly pointed out.

In the drawings—

Fig. 2 is a detail sectional view on an enlarged scale of the turbine.

Figs. 3 and 4 are detail views illustrating the construction of the liquid brake.

Figs. 5 and 6 are detail views of mechanism for controlling the liquid brake; and Fig. 7 is a detail view of the gate operating mechanism.

Figure 1:
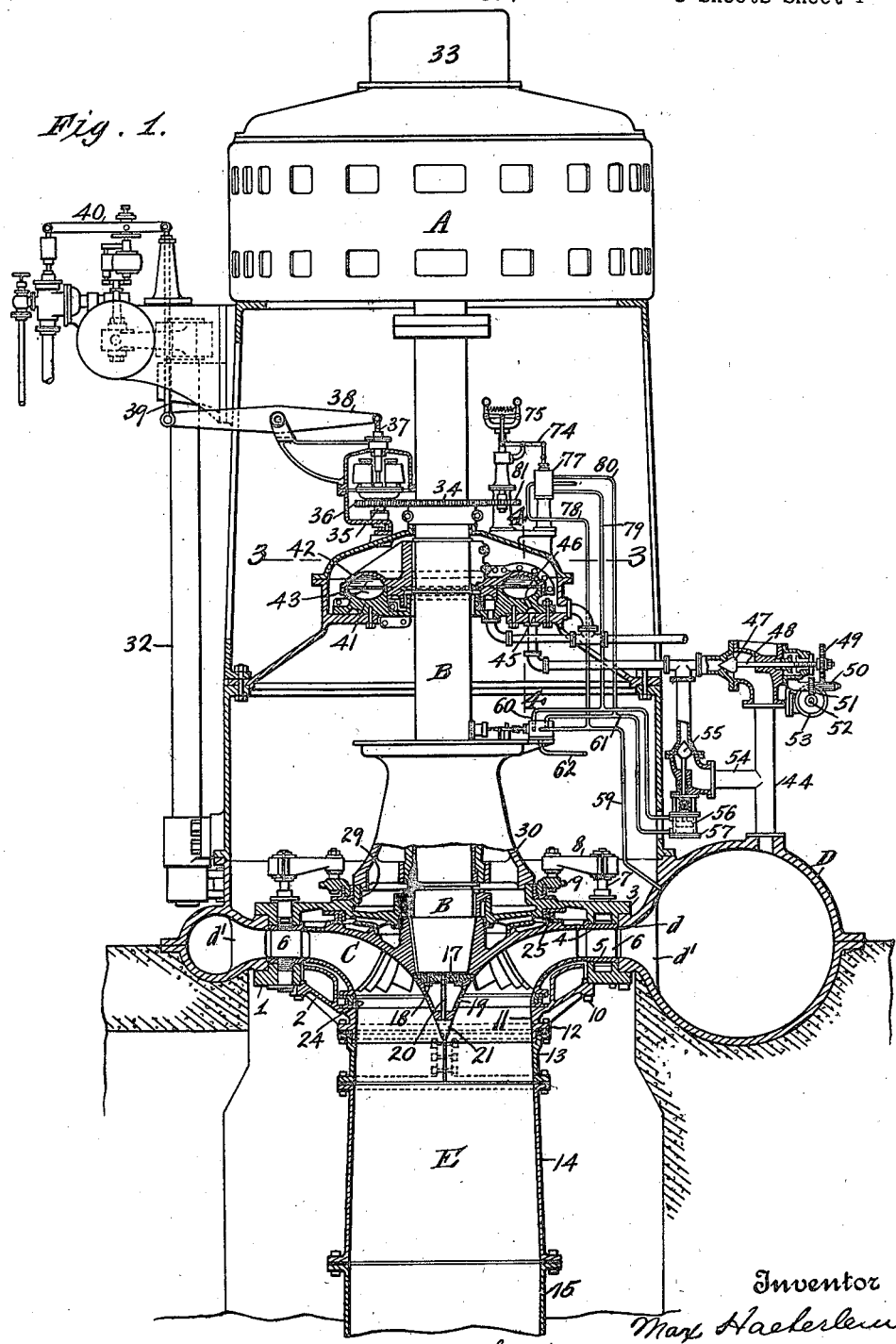
Fig. 1 is an elevation, partly in section, of a hydro-electric plant embodying the invention.

Referring to the drawings, the invention is illustrated as embodied in a plant comprising a high head reaction turbine with a vertical shaft driving an alternating current generator, and supplied with water through a spiral casing. The generator is indicated at A, the vertical shaft at B, the turbine runner at C, the spiral casing at D, and the draft tube at E. The spiral casing has a speed ring portion $d$ with speed or stay vanes $d'$.

The turbine casing comprises an outer bottom ring 1, an inner bottom ring 2, a top ring 3 and an upper and a lower inlet ring 4 and 5 respectively. Between the inlet rings 4 and 5 are mounted the pivoted guide vanes 6 whose pintles 7 extend upward and are provided with gate levers 8 connected to a shifting ring 9 arranged to be moved by the governing mechanism in the usual way.

The inner bottom ring 2 is detachably connected to the outer bottom ring 1 so as to be removable downwardly from the under side of the turbine. In the present example the inner bottom ring 2 is secured to the outer bottom ring 1 by bolts, as indicated at 10. The inner bottom ring 2 also carries a discharge ring 11, which may be formed integral with the ring 2 and which has a flange on its outer circumference, as shown at 12, for making a connection with a divided coupling ring 13 which connects the upper section 14 of the draft tube to the discharge ring. This upper section is flanged at its lower end for connection with the lower part 15 of the draft tube. By unbolting the segments of the coupling ring 13 and removing them and then disconnecting the upper section 14 from the lower portion 15 of the draft tube, the said upper section may be moved laterally out of the way, the foundation having a recess or space at one side to receive this section 14. This gives free access to the bottom of the turbine for the removal of the runner in the manner hereinafter explained.

The lower end of the turbine shaft is tapered and provided with a key, indicated at 16, to engage the runner. The runner has a correspondingly tapered opening to fit on the end of the shaft and is held in place by a washer plate 17, secured to the end of the shaft by machine screws 18. Below the washer-plate 17 is fitted a conoidal deflector 19 held to the washer plate by a rod 20 screwed into the washer-plate and having a conoidal head 21. The deflector 19 and the rod 20 are pinned together by a transverse pin indicated at 22. The heads of the machine screws 18 have their outer faces fitted against flattened inner faces of the deflector 19, so that neither the deflector nor the machine screws can turn. Furthermore, as the deflector 19 is pinned to the rod 20, the latter cannot unscrew. By removing the pin 22, the rod 20 may be turned to unscrew it, by inserting a bar in a transverse hole in the head 21. When the rod is unscrewed, the deflector 19 may be removed. Then the washer-plate 17 may be taken off. The runner ordinarily sticks to the end of the shaft and must be pulled off by the usual "wheel-puller." The runner, when pulled loose from its shaft can only fall a short distance as its lower packing ring 23 then rests on the packing ring 24 of the inner bottom ring 2 which is still held to the outer bottom ring 1 by the stud bolts 10.

A spider or cross-beam is now placed beneath the inner bottom ring and is secured to a cable let down from a crane through the hollow shaft. The cable being tightened, the load is taken off the stud bolts 10 whereupon the nuts of said bolts may be removed and the runner lowered by slacking off the cable. By the arrangement described the runner may be removed and replaced by another runner, or removed for inspection and repair and then returned to place. The method of replacing the runner will be obvious from the description given of the method of removing it.

An important feature of the invention consists in providing the upper side of the runner with a removable upper packing ring 25 whose upright flange is arranged to enter and fit closely in the groove of a top packing ring 26 secured to the underside of the top ring 3, and arranging for inspection of this packing.

It is very important that the packing rings 25 and 26 above mentioned shall be kept in proper condition, and therefore frequent inspection of these rings is advisable. In order to permit of an inspection of these rings without dismantling the turbine, a plurality of pairs of space-gage openings are provided, each pair extending from the groove in the top-packing ring 26 to the outside of the top ring, as indicated at 27, Fig. 2. These space-gage openings are screw-threaded at their upper ends to receive plugs 28. A plurality of such pairs of space-gage openings are provided in the top-ring 3, for example, 4 pairs arranged at 90° apart around the ring. At any time it is desired to inspect the packing rings 25 and 26 it is only necessary to remove the plugs 28 and insert a space gage or thickness gage, fixed on the end of a rod, down the openings 27, so as to gage the space between the walls of the packing rings. The information thus obtained will enable the attendant to determine whether or not the rings are worn and to what extent and whether or not the runner is properly centered in the casing. Such an inspection may be made without dismantling the apparatus and therefore will avoid the necessity for a periodic dismantling of the apparatus for inspection, as is the common practice now.

The top-ring 3 of the turbine carries a hub 29 in which is mounted a shaft-bearing 30. The shifting ring 9, hereinbefore referred to, is mounted on the outside of the hub 29, and is provided with an arm 31 to which the reach-rod 32 of the servo-motor is connected.

The turbine-shaft is suitably suspended from a suspension-bearing, which is indicated at 33. On account of the elasticity of the shaft and the necessary clearance of the suspension bearing there is always a slight amount of play of the shaft in the direction of its length, particularly when a spring suspension bearing is used. In large plants this longitudinal play of the shaft is not negligible, and where the turbine drives a direct-connected generator the length of the shaft and the necessary clearance of the suspension-bearing leads to considerable play at that part of the shaft below the generator.

Usually, the governor which controls the speed of the turbine has been driven either by a belt from a pulley on the shaft or by bevel wheels, one of which was secured to the turbine shaft. The belt was objectionable because of slippage. Where bevel-wheels are used the play of the shaft causes a change in the radii of the contact points of the meshing bevels. By either method of governor drive there is introduced an irregularity which prevents good regulation of the turbine. To overcome this difficulty the governor has in some cases been mounted directly on the turbine shaft itself. This, however, has introduced other difficulties. For example, the parts of the governor were larger in order to fit around the large shaft, and owing to their increased inertia were sluggish in response to changes of speed.

All of these disadvantages have been overcome in the present case by securing a spur gear wheel 34 on the shaft and providing the governor shaft 35 with a spur pinion 36 meshing directly into the spur gear wheel 34. This permits the longitudinal or axial movement of the shaft and its attached gear wheel 34 without changing the ratio of transmission, while at the same time permitting the use of a light and therefore sensitive governor and insuring a positive drive of the governor at all times.

In the present example the spur gear wheel 34 is secured to the shaft B above the turbine, but below the generator. This gear-wheel may be made in sections which are bolted together around the turbine-shaft. The turbine shaft and the generator shaft are shown in two parts coupled together to constitute one unitary shaft structure.

The regulating governor may be of any desired construction. As shown, it is a common form of fly ball governor, such, for example, of the general type illustrated by Patents Nos. 766,615, 941,745 and 1,352,189. The governor spindle 37 connects to a lever 38 which in turn is connected by a rod 39 to the end of the floating lever 40 of a suitable servo-motor apparatus such as is commonly used for controlling turbines and which need not be specifically described herein.

Another important feature of the apparatus consists of a liquid brake mechanism. This comprises a liquid brake having a stationary member 41 and a movable member 42, the latter being driven by the turbine, as, for example, by fixing it to the shaft of the turbine. Each member of the brake has a series of pockets or compartments separated from each other by blades 43 forming partitions sloping in the direction of rotation of the movable member as illustrated in Fig. 4. The two members are arranged so that the pockets or compartments of one member face those of the other member and the meeting edges of the two members are almost in contact with each other so that only a limited leakage of water can occur between the edges of the two members. Means is provided for supplying water to the pockets or compartments of the two members under pressure and for adjusting the pressure, whereby the compartments may be maintained under any pressure desired. These means will be described hereinafter.

The rotation of the rotary member forces the water to flow from one set of compartments to the other thereby absorbing energy, and the amount of such absorption depends upon the pressure of the water maintained in the compartments. Therefore, by varying the pressure, the braking effect on the turbine may be varied correspondingly.

In the best embodiment of the invention the supply of water under pressure is taken from the turbine inlet supply. The advantage of this is that the braking effect will increase in proportion to the increased pressure of the water supply to the turbine.

Furthermore, in the best embodiment of the invention the supply of water to the brake may be controlled by an emergency trip-mechanism which will operate in case the turbine reaches a certain maximum speed; also, by a governor device which at speed slightly below the said maximum will apply the brake to slow down the turbine, and release the brake as soon as the speed drops; and by a manually controlled valve mechanism, which may be operated from a distance.

In the embodiment of the invention shown in the drawings, the liquid brake is connected to the water supply for the turbine, by means of a supply pipe 44 leading from the spiral casing to an annular passage 45 in the stationary member 41 of the liquid brake. This annular passage in turn communicates with the compartments or pockets of the stationary member, or some of them, by several passages, one of which is indicated at 46.

The supply-pipe is provided with a control valve 47 which is arranged to be manually controlled. In the present example the valve stem 48 is provided with a gear wheel 49 in mesh with a pinion 50 having a worm wheel 51 engaging a worm 52 on the shaft of an electric motor 53 which can be controlled to rotate in either direction from a switch, not shown, which may be at a distance from the motor.

The supply pipe is provided with a branch 54 around the control valve 47. In this branch is an auxiliary control valve 55 arranged to be operated by a piston 56 in a cylinder 57. Water may be admitted to either side of this piston to move the valve 55 by means of a suitable controlling valve, as, for example, the slide valve mechanism illustrated in detail in Fig. 5.

This mechanism comprises a valve-chest 58 receiving water by a pressure pipe 59 from the spiral casing of the turbine. The chest has two ports connected to the respective ends of the cylinder 57 by pipes 60 and 61, and also has an exhaust port connected to a suitable discharge pipe 62. These ports are controlled by a slide valve 63 whose valve rod 64 is pivoted to a locking lever 65, arranged to be pulled by means of a spring 66 in a direction to admit water to the cylinder 57 to open the valve 55. The locking lever has a catch 67 normally engaged by a latch-lever 68 arranged to hold the locking lever against the action of the spring 66 so that the water pressure is maintained on that end of the cylinder 57 which will hold the valve 55 shut.

The turbine shaft carries an emergency trip-device normally out of contact with the latch-lever 68, but arranged to be thrown out by centrifugal force so as to trip said latch lever when the turbine reaches an excessive speed. In the present example this trip device comprises a weight 69 movable in a casing 70 secured to the turbine shaft, the weight being pressed inward yieldingly by a spring 71 whose compression may be adjusted by a screw cap 72. The weight 69 carries a trip-rod 73, whose end, when projected far enough, will strike the end of the latch-lever 68, thereby turning it so as to release the locking lever 65. Thereupon the spring 66 will move the locking lever and the slide valve 63 so as to admit water pressure to the cylinder 57 on the proper side of the piston to open the valve 55, while at the same time the slide valve 63 connects the opposite end of said cylinder with the discharge pipe 62. By this emergency mechanism, the valve 55 is opened to its full extent to admit a full supply of water to the brake and thereby stop the turbine. To start the turbine again the locking lever must be moved by hand and relatched.

In addition to the above emergency apparatus, there may be provided a governor mechanism for controlling the auxiliary control valve 55. This consists of a slide valve mechanism like that described hereinbefore, but having its slide valve connected to a lever 74 controlled by a centrifugal brake-actuating governor mechanism indicated generally at 75. The slide valve is indicated at 76, the valve chest at 77, the pressure pipe at 78 and the connecting pipes for supplying water to the respective ends of the valve cylinder 57 are indicated at 79, 80 respectively. The governor 75 is arranged to be driven from the turbine shaft in any suitable way, but preferably by a pinion 81 which meshes with the spur-gear 34 on the turbine shaft. This governor 75 is so set that it will not move the slide valve far enough to admit water to the valve-cylinder until the speed of the turbine is above a certain maximum. Thereupon, the governor applies the liquid brake, but as soon as the speed falls the governor closes the valve 55 and releases the brake.

The emergency trip device is not intended to come into operation unless something goes wrong with this governor 75 as well as with the servo-motor apparatus, and, hence, the emergency trip mechanism is set to trip its slide valve at a speed of the turbine higher than that at which the governor 75 applies the brake.

An important feature of this liquid brake apparatus is that without being of great size, it can be made to stop even the largest turbines, and to do this will require but a small amount of water. With such braking apparatus, if the turbine gates leak the turbine may be stopped by applying the liquid brake manually.

An important advantage of the liquid brake hereinbefore described is that the manually operated control valve may be left partly open at times of normal operation without material waste of water so that the turbine is then operating against a slight braking action. Therefore, immediately upon an increase of speed, the braking effect at once increases and thereby resists the increase, thus tending to maintain uniformity of speed.

While in the example illustrated in the drawings, the liquid brake is shown located between the turbine and the generator and has its movable member secured directly to the shaft, it is to be understood that it may be located and mounted in any desired manner without departing from the spirit of the invention.

What is claimed is:

1. In a hydraulic plant, the combination, with a hydraulic turbine, and a speed governor for controlling the admission of fluid thereto, of a liquid brake connected thereto, means for supplying liquid to said liquid brake to cause a braking action in said turbine, and means for controlling the pressure in the brake chamber.

2. In a hydraulic plant, the combination, with a hydraulic turbine, a conduit for supplying water thereto, and a speed governor for controlling the supply of water to the turbine from said conduit, of a liquid brake connected to the turbine, means for conducting water from said conduit to said liquid brake, and means for controlling the flow of water through said conducting means.

3. In a hydraulic plant, the combination, with a hydraulic turbine, and a speed governor for controlling the admission of fluid thereto, of a liquid brake connected thereto, means for supplying liquid to said liquid brake to cause a braking action in said turbine, and manually operable means for controlling said supply of liquid to the brake.

4. In a hydraulic plant, the combination, with a hydraulic turbine, and a speed governor driven by the turbine, and arranged to control the admission of fluid to the turbine, of a liquid brake connected to the turbine, means for supplying water thereto to brake the turbine, and an independent speed governor operated by the turbine and arranged to control the supply of water to the brake.

5. In a hydraulic plant, the combination, with a hydraulic turbine, and a liquid brake connected thereto, of a supply pipe arranged to conduct liquid to said liquid brake, a valve in said supply pipe normally shutting off the supply of water through said pipe to the brake, and means actuated on the arrival of the turbine at a predetermined maximum speed to operate said valve and thereby admit water to the brake.

6. In a hydraulic plant, the combination, with a hydraulic turbine, means for adjusting the supply of water to the turbine, and a speed governor driven by the turbine and arranged to control said adjusting means, of a liquid brake driven by the turbine, and means determined by the speed of the turbine for actuating the liquid brake to check the speed of the turbine.

7. In a hydraulic plant, the combination, with a hydraulic turbine, a liquid brake connected thereto, and a speed governor driven by the turbine and arranged to control the pressure in the liquid brake, of means actuated on the arrival of the turbine at a predetermined maximum speed for increasing the liquid pressure in the brake to stop the turbine.

8. In a hydraulic plant, the combination, with a hydraulic turbine, a speed governor for controlling the admission of fluid thereto and a liquid brake device, said brake device comprising a stationary member and a movable member, both of which are provided with coacting blades, said movable member being connected to the turbine rotor, of means for controlling the flow of liquid in the brake device.

9. In a hydraulic plant, the combination, with a hydraulic turbine, and a liquid brake device, said brake device comprising a stationary member and a movable member, both of which are provided with coacting blades, said movable member being connected to the turbine rotor, of controllable means for admitting water to the brake device between the two members thereof.

10. In a hydraulic plant, the combination, with a hydraulic turbine, and a liquid brake device comprising a stationary member having compartments separated by inclined blades, and a movable member arranged to be driven by the turbine rotor, said movable member having compartments separated by inclined blades, said members being arranged with their compartments facing each other and being separated only by a leakage space, of controllable means for admitting water to the compartments.

11. In a hydraulic plant, the combination with a hydraulic turbine, of an orbitally movable tripper device rotated in its orbit by said turbine and arranged to be moved by centrifugal force, a liquid brake connected to said turbine, a water supply pipe arranged to conduct water to said liquid brake, a valve for controlling the flow of liquid through said pipe, means tending to open said valve, and releasable means for holding said valve shut, said releasable means being in the path traveled by the tripper device when moved outward to a predetermined extent by centrifugal force.

12. In a hydraulic turbine, the combination, with a turbine casing having a portion of its casing removable in a downward direction, of a rotor within the casing, a rotor shaft on which said rotor is detachably secured and from which it may be removed in a downward direction, a draft-tube comprising a portion constituting a unitary structure movable in a direction transverse to the flow of water, and a separately detachable coupling device arranged to couple the draft tube to the turbine casing.

13. In a hydraulic plant, the combination, with a turbine casing having a downwardly removable bottom portion, and a rotor shaft, of a rotor within the casing and mounted on the rotor-shaft, said rotor being removable from the shaft and casing in a downward direction when the bottom of the casing is removed, a foundation arranged to support the turbine casing and allow the bottom portion thereof and the rotor to be removed downward, said foundation having a recess in one side, a draft-tube comprising an upper length and a lower length detachably connected by flanges meeting in a transverse plane, said upper length being a unitary structure arranged to be moved bodily in a lateral direction into the recess in one side of the foundation, and a split-ring serving to couple the upper end of the upper length of the draft tube to the turbine casing.

14. The combination, with a vertical shaft turbine in which the vertical shaft is mounted to permit a slight endwise play during operation of the turbine, of a spur gear fixed to the turbine shaft, a speed governor having a shaft, a pinion on said shaft in mesh with the spur gear, and means controlled by the speed-governor for regulating the speed of the turbine.

15. The combination, with a vertical shaft turbine and a generator, the turbine shaft and the generator shaft constituting one unitary shaft-structure, of a spur-gear fixed to the said unitary shaft-structure, a speed governor having a shaft, a pinion on the governor shaft in mesh with the spur-gear, and means controlled by the speed governor for regulating the speed of the turbine and generator.

16. The combination, with a vertical shaft turbine and a generator, the turbine shaft and the generator shaft constituting one unitary structure, a suspension bearing supporting said shaft, and a spur-gear fixed to said unitary shaft-structure, of a speed governor having a shaft, a pinion on the governor shaft in mesh with the spur-gear, and means controlled by the speed governor for regulating the speed of the turbine and generator.

17. The combination, with a vertical shaft turbine and a generator, the turbine shaft and the generator shaft constituting one unitary structure, a spring suspension bearing supporting said shaft, and a spur-gear fixed to said unitary shaft-structure, of a speed governor having a shaft, a pinion on the governor shaft in mesh with the spur-gear, and means controlled by the speed governor for regulating the speed of the turbine and generator.

18. In a hydraulic turbine, the combination, with a rotor having a circular packing flange, of a casing having a groove to receive said packing flange and within which it travels, said casing having openings at a plurality of points over said groove whereby a space gage may be introduced to gage the clearances between the packing flange of the rotor and the side walls of the groove, and removable means for closing said openings water-tight.

In testimony whereof, I have hereunto set my hand.

MAX HAEBERLEIN.